US011912107B2

(12) United States Patent
Zhu et al.

(10) Patent No.: US 11,912,107 B2
(45) Date of Patent: Feb. 27, 2024

(54) AIR OUTFLOW DEVICE, CONSOLE AND VEHICLE

(71) Applicant: NIO TECHNOLOGY (ANHUI) CO., LTD, Hefei (CN)

(72) Inventors: Chunhua Zhu, Shanghai (CN); Haobin Zhang, Shanghai (CN); Tao Wang, Shanghai (CN); Han Zhang, Shanghai (CN); Guangming Tian, Shanghai (CN); Yong Li, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 53 days.

(21) Appl. No.: 17/570,000

(22) Filed: Jan. 6, 2022

(65) Prior Publication Data

US 2022/0212523 A1 Jul. 7, 2022

(30) Foreign Application Priority Data

Jan. 7, 2021 (CN) .......................... 202110018327.1

(51) Int. Cl.
*B60H 1/34* (2006.01)
*B60H 1/00* (2006.01)

(52) U.S. Cl.
CPC ....... *B60H 1/3421* (2013.01); *B60H 1/00428* (2013.01); *B60H 2001/3478* (2013.01)

(58) Field of Classification Search
CPC .............. B60H 1/3421; B60H 1/00428; B60H 2001/3478

(Continued)

(56) References Cited

U.S. PATENT DOCUMENTS 5,186,387 A * 2/1993 Doi ..................... B60H 1/00871
236/49.3
5,954,579 A * 9/1999 Masui .................. B60H 1/3414
454/285

(Continued)

FOREIGN PATENT DOCUMENTS

CN 209920991 U * 1/2020 ............... B60H 1/34
DE 102017111011 A1 * 7/2017 ........... B60H 1/3414

*Primary Examiner* — Avinash A Savani
*Assistant Examiner* — Dana K Tighe
(74) *Attorney, Agent, or Firm* — Sheridan Ross P.C.

(57) ABSTRACT

The invention relates to the technical field of air outflow, and aims to solve the problem whereby louvers in an air outflow device in a current vehicle needs to be manually turned to adjust an air outflow direction. The invention provides an air outflow device. An opening/closing member and an air distribution member are rotatably disposed in an air inflow section, an outlet of a first air outflow section and an outlet of a second air outflow section are respectively provided with a first louver structure and a second louver structure, and a first driving member and a second driving member are disposed outside an air channel. The first driving member is capable of driving the opening/closing member to open/close the air inflow section so as to connect/disconnect the air inflow section, and is capable of driving the air distribution member to rotate so as to adjust an air outflow amount and a longitudinal air outflow direction. The second driving member is capable of driving the first louver structure and the second louver structure to swing together so as to adjust a transverse air outflow direction. According to the invention, the air outflow direction is adjusted without the need for manually turning the louvers, so that the air outflow device is convenient to use.

8 Claims, 5 Drawing Sheets

(58) Field of Classification Search
USPC .......................................................... 454/155
See application file for complete search history.

(56) References Cited

U.S. PATENT DOCUMENTS

| | | | |
|---|---|---|---|
| 6,179,707 B1* | 1/2001 | Arold | B60H 1/3421 |
| | | | 454/150 |
| 6,902,474 B2* | 6/2005 | Gehring | B60H 1/3414 |
| | | | 454/153 |
| 6,941,967 B2* | 9/2005 | Butera | B60H 1/00842 |
| | | | 137/829 |
| 2020/0009945 A1* | 1/2020 | Doll | B60H 1/3421 |

* cited by examiner

AIR OUTFLOW DEVICE, CONSOLE AND VEHICLE

CROSS-REFERENCE TO RELATED APPLICATION

This application claims the benefit of China Patent Application No. 202110018327.1 filed Jan. 7, 2021, the entire contents of which are incorporated herein by reference in its entirety.

TECHNICAL FIELD

The invention relates to the technical field of air outflow, and particularly provides an air outflow device, a console and a vehicle.

BACKGROUND ART

Vehicles are one of indispensable transportation means for people to go out. In order to improve comfort, an air outflow device is generally provided in a vehicle. In hot summer, the air outflow device can deliver cold air into the vehicle to reduce the temperature in the vehicle. In cold winter, the air outflow device can deliver warm air into the vehicle to increase the temperature in the vehicle. The configuration of the air outflow device enables a driver and a passenger to drive and ride the vehicle under appropriate temperature conditions regardless of freezing winter and sultry summer, greatly improving the comfort. Generally, in order to adjust an air outflow direction of the air outflow device, louvers are provided at an air outlet of the air outflow device, and when it is necessary to adjust the air outflow direction, the driver or the passenger needs to manually turn the louvers to adjust the air outflow direction, bringing inconvenience in use to the driver or the passenger.

Therefore, there is a need in the art for a novel air outflow device, a console and a vehicle to solve the above problem.

SUMMARY OF THE INVENTION

The invention provides an air outflow device, in order to solve the above problem in the prior art whereby louvers in an air outflow device in a current vehicle needs to be manually turned to adjust an air outflow direction, bringing inconvenience in use. The air outflow device comprises a shell, wherein an air channel is formed in the shell, the air channel comprises an air inflow section and a first air outflow section and a second air outflow section separately in communication with the air inflow section, an opening/closing member and an air distribution member are rotatably disposed in the air inflow section, and an outlet of the first air outflow section and an outlet of the second air outflow section are respectively provided with a first louver structure and a second louver structure. When air flows out of both the outlet of the first air outflow section and the outlet of the second air outflow section, an airflow flowing out of the outlet of the first air outflow section is capable of at least partially merging with an airflow flowing out of the outlet of the second air outflow section. A first driving member and a second driving member are disposed outside the air channel. The first driving member is capable of driving the opening/closing member to open/close the air inflow section so as to connect/disconnect the air inflow section, and is capable of driving the air distribution member to rotate so as to adjust an opening degree of an inlet of the first air outflow section or an inlet of the second air outflow section, adjusting an air outflow amount and a longitudinal air outflow direction. The second driving member is capable of driving the first louver structure and the second louver structure to swing together so as to adjust a transverse air outflow direction.

With such a configuration, it is possible to change the longitudinal and transverse air outflow directions of the air outflow device by means of the first driving member and the second driving member without the need for manually turning the louvers to adjust the air outflow direction, such that the air outflow device is convenient to use. In addition, the first driving member can not only adjust the longitudinal air outflow direction by driving the air distribution member, but also can drive the opening/closing member to control the opening/closing of the air inflow section, that is to say, the air distribution member and the opening/closing member are both controlled by means of one first driving member, thereby achieving two functions of adjusting the longitudinal air outflow direction and controlling the opening/closing of the air inflow section. In comparison with driving the air distribution member and the opening/closing member respectively by means of different driving members, such an air outflow device has a more compact structure, which is beneficial to a miniaturization design of the air outflow device. Moreover, the first louver structure and the second louver structure can be both driven by means of one second driving member, such that the air outflow device has a more compact structure, which is more beneficial to the miniaturized design of the air outflow device.

In a preferred technical solution of the air outflow device described above, the first driving member is a first electric motor, the air distribution member is fixedly connected to an output portion of the first electric motor, a first sliding structure and a stop member are further fixedly connected to the output portion of the first electric motor, a transmission member fixedly connected to the opening/closing member is disposed outside the air channel, and a second sliding structure is disposed on the transmission member; when the first sliding structure is not slidably connected to the second sliding structure, the stop member is capable of preventing the movement of the transmission member; and when the first sliding structure is slidably connected to the second sliding structure, the stop member is capable of disengaging from the transmission member to allow the movement of the transmission member under the action of the first sliding structure.

With such a configuration, the transmission member is prevented from rotating due to its own weight or an external force when there is no need to rotate. Therefore, the situation is prevented that the first sliding structure and the second sliding structure cannot smoothly enter a slidable connection state due to the rotation of the transmission member, and the opening/closing member rotates is prevented from rotating due to the rotation of the transmission member, otherwise the air inflow section is mistakenly connected or disconnected.

In a preferred technical solution of the air outflow device described above, the stop member is a stop block having an arc-shaped groove, and an arc-shaped edge slidably cooperating with the arc-shaped groove is formed on the transmission member.

With such a configuration, it is possible to allow the stop member to restrict the movement of the transmission member in a timely manner by means of a relatively simple structure. In addition, such a structure is easy to machine, which is beneficial to improving the production efficiency.

In a preferred technical solution of the air outflow device described above, the second driving member is a second electric motor, a connecting column is fixedly connected to an output portion of the second electric motor, a first protrusion and a second protrusion are formed on the connecting column, a column sleeve is fitted over the connecting column, a first helical groove and a second helical groove respectively corresponding to the first protrusion and the second protrusion are formed on the column sleeve, the first helical groove and the second helical groove have the same helical direction, and a first transmission rod and a second transmission rod are further fixed to the column sleeve; the first transmission rod is connected to the first louver structure by means of a first transmission assembly, and the second transmission rod is connected to the second louver structure by means of a second transmission assembly; a third sliding structure is disposed on the column sleeve, a fourth sliding structure slidably connected to the third sliding structure is further disposed in the shell, and the third sliding structure and the fourth sliding structure are relatively slidable only in an axial direction of the column sleeve; the second electric motor is capable of driving the column sleeve to rotate such that the first protrusion and the second protrusion respectively slide in the first helical groove and the second helical groove, the column sleeve moves in the axial direction, the first transmission rod and the second transmission rod then both move in the axial direction, and the first transmission assembly and the second transmission assembly are moved to drive the first louver structure and the second louver structure to swing together in the same direction.

With such a configuration, it is possible that a structure of reversing the direction of movement between the output portion of the second electric motor and the first louver structure and between the output portion of the second electric motor and the second louver structure is convenient to maintain and has high transmission efficiency.

In a preferred technical solution of the air outflow device described above, the first louver structure comprises a plurality of first louvers, and the first transmission assembly comprises a first mounting plate and at least one first connecting rod, wherein the first mounting plate is fixedly connected to the first transmission rod, the first connecting rods are equal in number to the first louvers and correspond to the first louvers on a one-to-one basis, a first end of each of the first connecting rods is hinged to the first mounting plate, and a second end of each of the first connecting rods is fixedly connected to the corresponding first louver; a first mounting frame is disposed in the outlet of the first air outflow section, and each of the first louvers is hinged to the first mounting frame; the second louver structure comprises a plurality of second louvers, the second transmission assembly comprises a second mounting plate and at least one second connecting rod, wherein the second mounting plate is fixedly connected to the second transmission rod, the second connecting rods are equal in number to the second louvers and correspond to the second louvers on a one-to-one basis, a first end of each of the second connecting rods is hinged to the second mounting plate, and a second end of each of the second connecting rods is fixedly connected to the corresponding second louver; a second mounting frame is disposed in the outlet of the second air outflow section, and each of the second louvers is hinged to the second mounting frame; and when the first transmission rod and the second transmission rod move in the same direction, the first mounting plate and the second mounting plate both move in the same direction and finally make all of the first louvers and all of the second louvers swing together in the same direction.

With such a configuration, all the first louvers and all the second louvers can swing together in the same direction, that is to say, the outlet of the first air outflow section and the outlet of the second air outflow section have the same transverse air outflow direction, thereby facilitating adjustment of the air outflow direction in a longitudinal direction, avoiding adjustment of the longitudinal air outflow direction of part of the airflow due to the difference in the transverse air outflow directions of the outlet of the first air outflow section and the outlet of the second air outflow section.

In a preferred technical solution of the air outflow device described above, a first auxiliary mounting groove and a second auxiliary mounting groove are formed in the end of the column sleeve close to the output portion of the second electric motor, the first auxiliary mounting groove is in communication with the end of the first helical groove close to the output portion of the second electric motor, and the second auxiliary mounting groove is in communication with the end of the second helical groove close to the output portion of the second electric motor; and/or a third auxiliary mounting groove and a fourth auxiliary mounting groove are formed in the end of the column sleeve remote from the output portion of the second electric motor, the third auxiliary mounting groove is in communication with the end of the first helical groove remote from the output portion of the second electric motor, and the fourth auxiliary mounting groove is in communication with the end of the second helical groove remote from the output portion of the second electric motor.

With such a configuration, in the case where the first auxiliary mounting groove and the second auxiliary mounting groove are formed on the column sleeve, when the column sleeve and the connecting column are assembled, the first protrusion and the second protrusion can respectively enter the first helical groove and the second helical groove through the first auxiliary mounting groove and the second auxiliary mounting groove, facilitating assembly of the column sleeve and the connecting column.

In the case where the third auxiliary mounting groove and the fourth auxiliary mounting groove are formed on the column sleeve, when the column sleeve and the connecting column are assembled, the first protrusion and the second protrusion can respectively enter the first helical groove and the second helical groove through the third auxiliary mounting groove and the fourth auxiliary mounting groove, facilitating assembly of the column sleeve and the connecting column.

In the case where the first auxiliary mounting groove, the second auxiliary mounting groove, the third auxiliary mounting groove and the fourth auxiliary mounting groove are formed on the column sleeve, when the column sleeve and the connecting column are assembled, the first protrusion and the second protrusion can respectively either enter the first helical groove and the second helical groove through the first auxiliary mounting groove and the second auxiliary mounting groove or enter the first helical groove and the second helical groove through the third auxiliary mounting groove and the fourth auxiliary mounting groove, providing two ways of assembly, and further facilitating assembly of the column sleeve and the connecting column.

In a preferred technical solution of the air outflow device described above, a rotation stop structure is disposed on the connecting column, a limiting structure is disposed on a mounting base of the second electric motor, and the limiting structure is capable of restricting a rotation stroke of the rotation stop structure to restrict a rotation stroke of the connecting column, thereby restricting swing ranges of the first louver structure and the second louver structure.

With such a configuration, it is possible to restrict the swing ranges of the first louver structure and the second louver structure, and the structure is simple and is easy to machine.

In a preferred technical solution of the air outflow device described above, a flow guiding structure is disposed between the outlet of the first air outflow section and the outlet of the second air outflow section, and the flow guiding structure comprises a first flow guiding portion and a second flow guiding portion, wherein a first end of the first flow guiding portion is connected to the outlet of the first air outflow section, and the first flow guiding portion is configured to be capable of guiding a flow in a tangential direction of the outlet of the first air outflow section; a first end of the second flow guiding portion is connected to the outlet of the second air outflow section, and the second flow guiding portion is configured to be capable of guiding a flow in a tangential direction of the outlet of the second air outflow section; and a second end of the first flow guiding portion is connected to a second end of the second flow guiding portion.

In another aspect, the invention further provides a console. The console comprises a housing and the air outflow device as described above. The air outflow device is disposed in the housing, a covering portion is formed to extend on the housing, and the covering portion is capable of at least partially shielding the outlet of the first air outflow section and the outlet of the second air outflow section.

With such a configuration, the console also has the beneficial effects of the foregoing air outflow device. Furthermore, the outlet of the first air outflow section and the outlet of the second air outflow section can be shielded to a certain extent, making the appearance more attractive.

In a further aspect, the invention further provides a vehicle comprising the air outflow device as described above or the console as described above.

With such a configuration, the vehicle also has the beneficial effects of the air outflow device or the console as described above.

REFERENCE SIGNS

Figure 1:
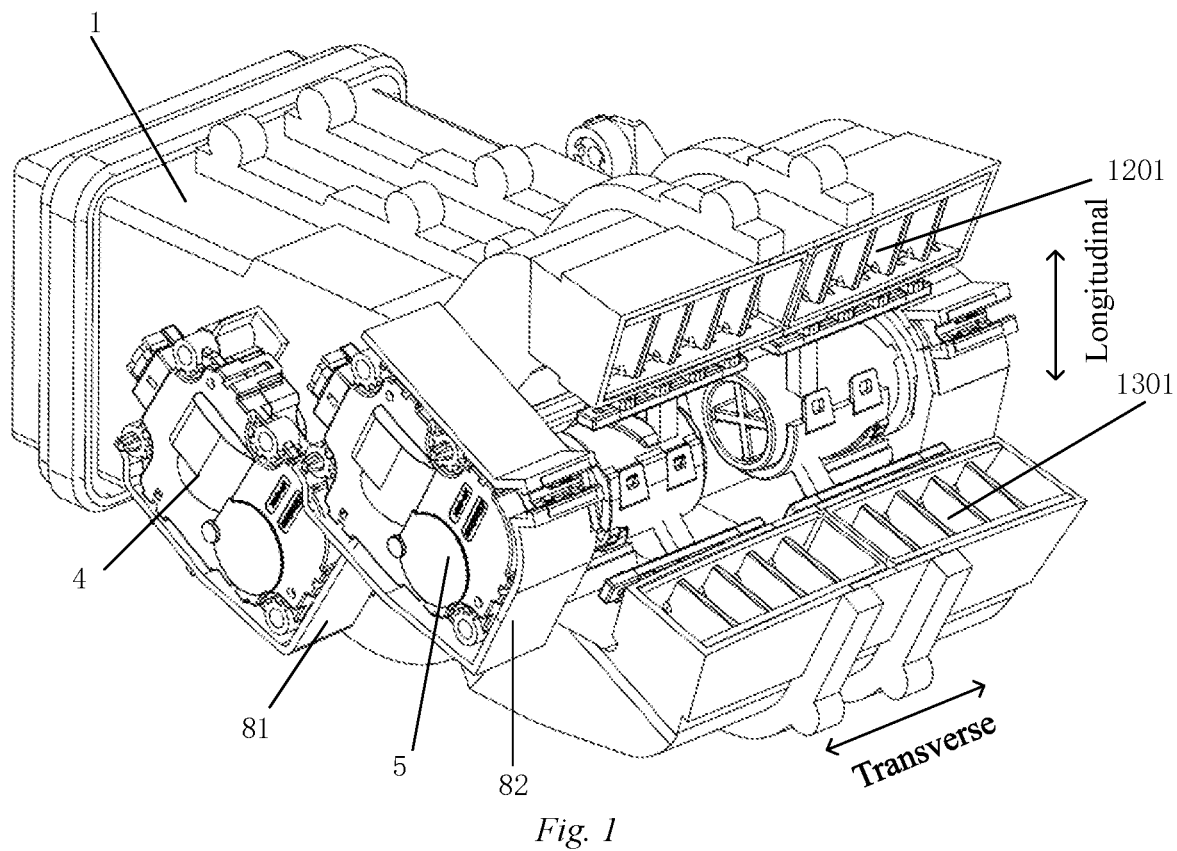
FIG. 1 is a schematic structural diagram of an air supply device of the invention, showing two air supply devices disposed together.
Figure 2:
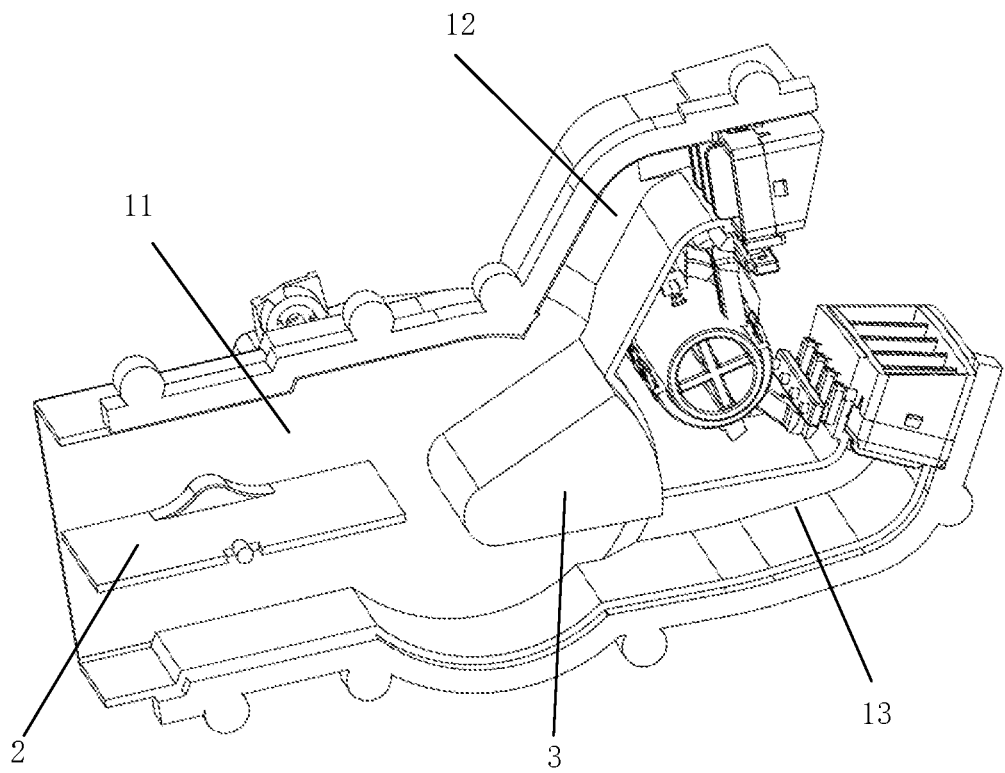
FIG. 2 is a schematic structural diagram of the air supply device of the invention, with part of a shell hidden.

1. Shell; 11. Air inflow section; 12. First air outflow section; 1201. First louver structure; 1202. First mounting frame; 13. Second air outflow section; 1302. Second mounting frame; 1301. Second louver structure; 2. Opening/closing member; 3. Air distribution member; 4. First driving member; 401. First sliding structure; 402. Stop member; 5. Second driving member; 501. Connecting column; 5011. First protrusion; 5012. Second protrusion; 5013. Rotation stop structure; 502. Column sleeve; 50201. First transmission rod; 50202. Second transmission rod; 50203. Third sliding structure; 5021. First half column sleeve; 50211. First snap-fit portion; 5022. Second half column sleeve; 50221. Second snap-fit portion; 6. Transmission member; 601. Second sliding structure; 71. First mounting plate; 72. First connecting rod; 73. Second mounting plate; 74. Second connecting rod; 81. Mounting base of first electric motor; 811. Fourth sliding structure; 82. Mounting base of second electric motor; 821. Limiting structure; 822. Fourth sliding structure; 100. First helical groove; 200. Second helical groove; 300. First auxiliary mounting groove; 400. Second auxiliary mounting groove; 500. arc-shaped groove; 600. Arc-shaped edge.

DETAILED DESCRIPTION OF EMBODIMENTS

Preferred embodiments of the invention are described below with reference to the drawings. It should be understood by those skilled in the art that these embodiments are only for explaining the technical principles of the invention and are not intended to limit the scope of protection of the invention.

It should be noted that, in the description of the invention, the terms that indicate the direction or positional relationship, such as "center", "upper", "lower", "left", "right", "vertical", "horizontal", "inner", "outer", "front", "rear", "transverse" and "longitudinal" are based on the direction or positional relationship shown in the figures, which is merely for ease of description instead of indicating or implying that the device or element must have a particular orientation and be constructed and operated in a particular orientation, and therefore, should not be construed as limiting the invention. In addition, the terms "first", "second", "third" and "fourth" are for descriptive purposes only and should not be construed as indicating or implying relative importance.

In addition, it should also be noted that, in the description of the invention, the terms "dispose", "mount", "engage" and "connect" should be interpreted in a broad sense unless explicitly defined and limited otherwise, which, for example, may mean a fixed connection, a detachable connection or an integral connection; may mean a mechanical connection or an electrical connection; and may mean a direct connection, an indirect connection by means of an intermediary, or internal communication between two elements. For those skilled in the art, the specific meaning of the above-mentioned terms in the invention can be interpreted according to the specific situation.

As shown in FIGS. 1 to 7, the invention provides an air outflow device (two air outflow devices are shown in FIG. 1). The air outflow device comprises a shell 1. An air channel is formed in the shell 1, the air channel comprises an air inflow section 11 and a first air outflow section 12 and a second air outflow section 13 respectively in communication with the air inflow section 11. An opening/closing member 2 and an air distribution member 3 are rotatably disposed in the air inflow section 11, and an outlet of the first air outflow section 12 and an outlet of the second air outflow section 13 are respectively provided with a first louver structure 1201 and a second louver structure 1301. When air flows out of both the outlet of the first air outflow section 12 and the outlet of the second air outflow section 13, an airflow flowing out of the outlet of the first air outflow section 12 can at least partially merge with an airflow flowing out of the outlet of the second air outflow section 13. A first driving member 4 and a second driving member 5 are disposed outside the air channel. The first driving member 4 can drive the opening/closing member 2 to open/close the air inflow section 11 so as to connect/disconnect the air inflow section 11 and can drive the air distribution member 3 to rotate so as to adjust an opening degree of an inlet of the first air outflow section 12 or an inlet of the second air outflow section 13, adjusting an air outflow amount and a longitudinal air outflow direction. The second driving member 5 can drive the first louver structure 1201 and the second louver structure 1301 to swing together so as to adjust a transverse air outflow direction.

It should be noted that the air outflow device of the invention may be applied to a vehicle, or be applied to a household air conditioner or other equipment in which an airflow needs to be delivered. Such an adjustment of application objects of the air outflow device does not limit the invention, which shall be limited within the scope of protection of the invention. The air inflow section 11 is in communication with an air source (for example, a fan and an air conditioning system of an vehicle). When the opening/closing member 2 opens the air inflow section 11, the airflow from the air source can flow through the air inflow section 11, the air outflow device can deliver the airflow from the air source out of the outlet of the first air outflow section 12 and the outlet of the second air outflow section 13. When the opening/closing member 2 closes the air inflow section 11, since the air inflow section 11 is disconnected, the airflow from the air source cannot flow through the air inflow section 11, and the outlet of the first air outflow section 12 and the outlet of the second air outflow section 13 in the air outflow device stop delivering the airflow.

The air distribution member 3 rotates to adjust the opening degree of the inlet of the first air outflow section 12 or the inlet of the second air outflow section 13. That is to say, the air distribution member 3 can alternatively block the inlet of the first air outflow section 12 or the inlet of the second air outflow section 13. When the inlet of the first air outflow section 12 is blocked, the inlet of the first air outflow section 12 can be completely or partially blocked. When the inlet of the second air outflow section 13 is blocked, the inlet of the second air outflow section 13 can be completely or partially blocked. In the case where the first air outflow section 12 is located above the second air outflow section 13 (it is the case shown in FIG. 1), when the air distribution member 3 completely blocks the inlet of the first air outflow section 12, all the air is distributed to the second air outflow section 13, at this moment, the blown air will be blown downwards at the maximum limit angle, and the longitudinal air outflow direction is the air outflow direction of the second air outflow section 13 in a longitudinal direction. When the air distribution member 3 completely blocks the inlet of the second air outflow section 13, all the air is distributed to the first air outflow section 12, at this moment, the blown air will be blown upwards at the maximum limit angle, and the longitudinal air outflow direction is the air outflow direction of the first air outflow section 12 in the longitudinal direction. When the air distribution member 3 partially blocks the inlet of the first air outflow section 12, most of the air is distributed to the second air outflow section 13, and a small part of the air is distributed to the first air outflow section 12, at this moment, the air blown out by the second air outflow section 13 is partially offset by the air blown out by the first air outflow section 12, thereby making the longitudinal air outflow direction slightly downward compared with the air outflow direction when the air distribution member 3 completely blocks the inlet of the first air outflow section 12. When the air distribution member 3 partially blocks the inlet of the second air outflow section 13, most of the air is distributed to the first air outflow section 12, and a small part of the air is distributed to the second air outflow section 13, at this moment, the air blown by the first air outflow section 12 is partially offset by the air blown by the second air outflow section 13, thereby making the longitudinal air outflow direction slightly upward compared with the air outflow direction when the air distribution member 3 completely blocks the inlet of the second air outflow section 13.

In the above description, the opening/closing member 2 may use an opening/closing plate, an opening/closing block, etc., and those skilled in the art would have been able to flexibly the specific structure of the opening/closing member 2 in practical applications as long as the opening/closing member 2 can open/close the air inflow section 11 under the drive of the first driving member 4 so as to connect/disconnect the air inflow section 11. The air distribution member 3 may be a sector-shaped air distribution block, a circular air distribution block, etc., and those skilled in the art would have been able to flexibly the specific structure of the air distribution member 3 in practical applications as long as the air distribution member 3 can rotate under the drive of the first driving member 4 to adjust the opening degree of the inlet of the first air outflow section 12 or the inlet of the second air outflow section 13, adjusting the air outflow amount and the longitudinal air outflow direction.

Figure 3:
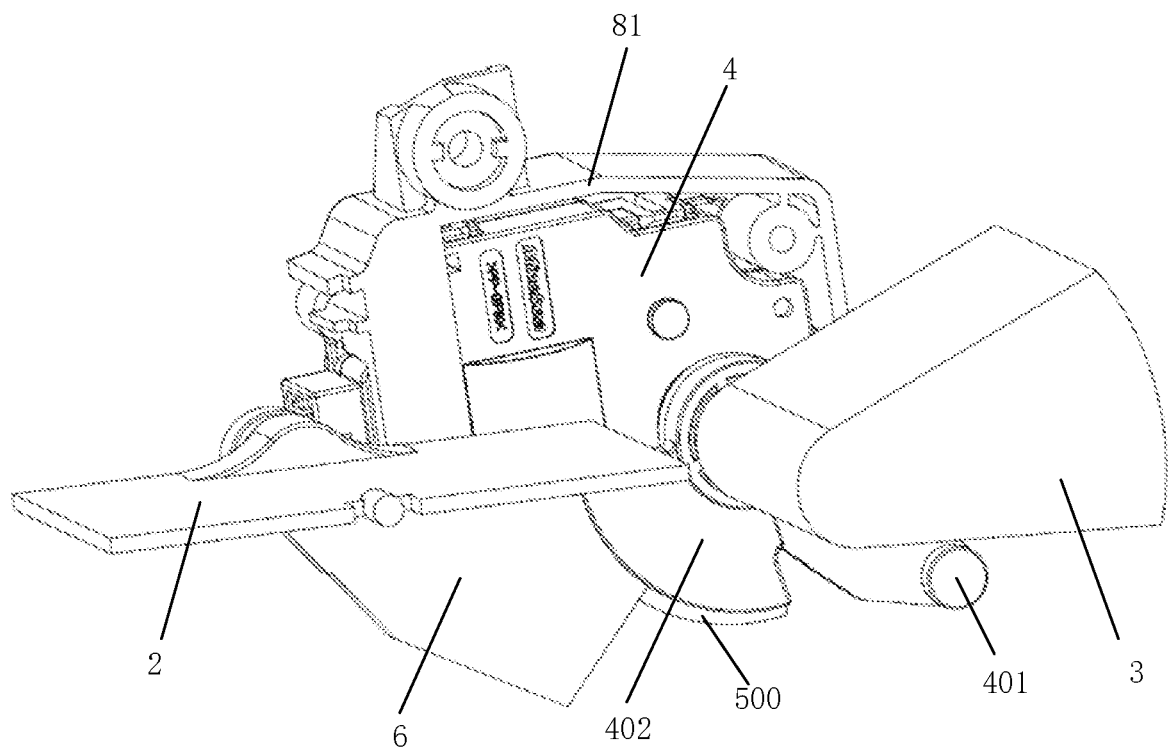
FIG. 3 is a schematic structural diagram of part of a structure of the air supply device of the invention, showing at least a stop member, a transmission member, a first driving member, and an opening/closing member.
Figure 4:
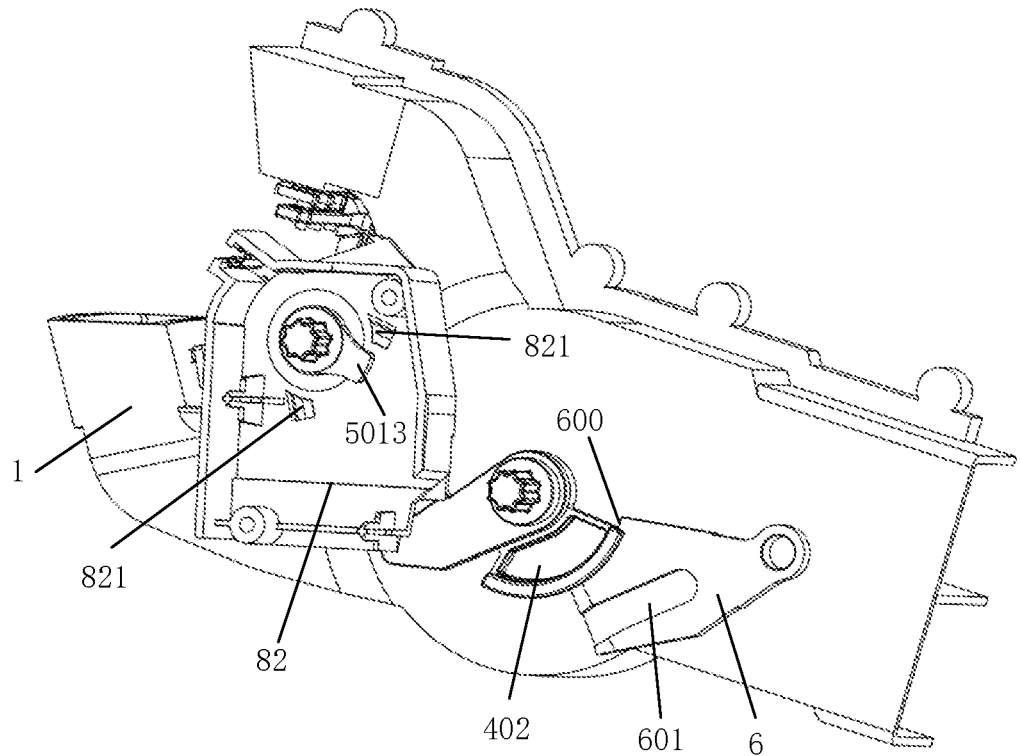
FIG. 4 is a schematic structural diagram of part of the structure of the air supply device of the invention, showing at least the shell, the stop member, and the transmission member.

Preferably, as shown in FIGS. 3 and 4, the first driving member 4 is a first electric motor, the air distribution member 3 is fixedly connected to an output portion of the first electric motor, a first sliding structure 401 and a stop member 402 are further fixedly connected to the output portion of the first electric motor, a transmission member 6 fixedly connected to the opening/closing member 2 is disposed outside the air channel, and a second sliding structure 601 is disposed on the transmission member 6. When the first sliding structure 401 is not slidably connected to the second sliding structure 601, the stop member 402 can prevent the movement of the transmission member 6. When the first sliding structure 401 is slidably connected to the second sliding structure 601, the stop member 402 can disengage from the transmission member 6 to allow the movement of the transmission member 6 under the action of the first sliding structure 401. In the case shown in FIGS. 3 and 4, the first sliding structure 401 is a slider, and the second sliding structure 601 is a sliding groove. During rotation of the output portion of the first electric motor in the counterclockwise direction, the slider is gradually slidably connected to the sliding groove. When the slider starts to be slidably connected to the sliding groove, the stop member 402 exactly disengages from the transmission member 6. During relative sliding between the slider and the sliding groove, the transmission member 6 rotates under the action of the slider. When the slider slides to the tail end of the sliding groove (at this moment, the slider cannot continue to slide along the sliding groove), the opening/closing member 2 rotates to a position where the air inflow section 11 can be closed, so as to disconnect the air inflow section 11, such that the airflow from the air source cannot flow through the air inflow section 11. Later, the output portion of the first electric motor can rotate in the clockwise direction, at this moment, the slider slides out of the sliding groove. During the sliding, the transmission member 6 rotates under the action of the slider such that the opening/closing member 2 rotates to a position where the air inflow section 11 can be opened, so as to connect the air inflow section 11, and at the moment when the slider is separated from the sliding groove, the stop member 402 comes into contact with the transmission member 6 again and prevents the movement of the transmission member 6.

Instead of the electric motor, the first driving member 4 may also be a combined structure of a gear, a rack and an air cylinder. Specifically, the air cylinder is directly connected to the rack, the rack meshes with the gear, and a shaft passes through a central hole of the gear to serve as an output shaft. Those skilled in the art would have been able to flexibly the specific structure of the first driving member 4 in practical applications, and such an adjustment and change in the specific structure of the first driving member 4 do not limit the invention, which shall be limited within the scope of protection of the invention. The first sliding structure 401 may be a sliding groove, a slider, etc., the second sliding structure 601 may accordingly be a slider, a sliding groove, etc., and the transmission member 6 may be a transmission plate, a transmission rod, etc. Those skilled in the art would have been able to flexibly the specific structures of the first sliding structure 401, the second sliding structure 601 and the transmission member 6 in practical applications, and such adjustments and changes in the specific structures of the first sliding structure 401, the second sliding structure 601 and the transmission member 6 do not limit the invention, which shall be limited within the scope of protection of the invention.

Alternatively, instead of fixedly connecting the stop member 402 to the output portion of the first electric motor, it is also possible that the transmission member 6 is configured to be made of a magnetically attractable material such as iron and nickel or a magnet is fixed to the transmission member 6, and an electromagnet is disposed in the shell 1. When it is necessary to prevent the movement of the transmission member 6, the electromagnet is energized to prevent the movement of the transmission member 6 by means of magnetic attraction.

Preferably, as shown in FIGS. 3 and 4, the stop member 402 is a stop block having an arc-shaped groove 500, and an arc-shaped edge 600 slidably cooperating with the arc-shaped groove 500 is formed on the transmission member 6. In addition, it is also possible that an arc-shaped groove is formed on the transmission member 6, the stop member 402 is a stop block having an arc-shaped block, and the arc-shaped block has the same curvature as the arc-shaped groove. When the arc-shaped block slides in the arc-shaped groove, the stop member 402 can also prevent the movement of the transmission member 6. When the arc-shaped block completely slides out of the arc-shaped groove, that is to say, when the stop member 402 disengages from the transmission member 6, the transmission member 6 can move at this moment. Those skilled in the art would have been able to flexibly the specific structure of the stop member 402 in practical applications, as long as the stop member 402 can prevent the movement of the transmission member 6 when the first sliding structure 401 is not slidably connected to the second sliding structure 601, and when the first sliding structure 401 is slidably connected to the second sliding structure 601, the stop member 402 can disengage from the transmission member 6 to allow the movement of the transmission member 6 under the action of the first sliding structure 401.

Figure 5:
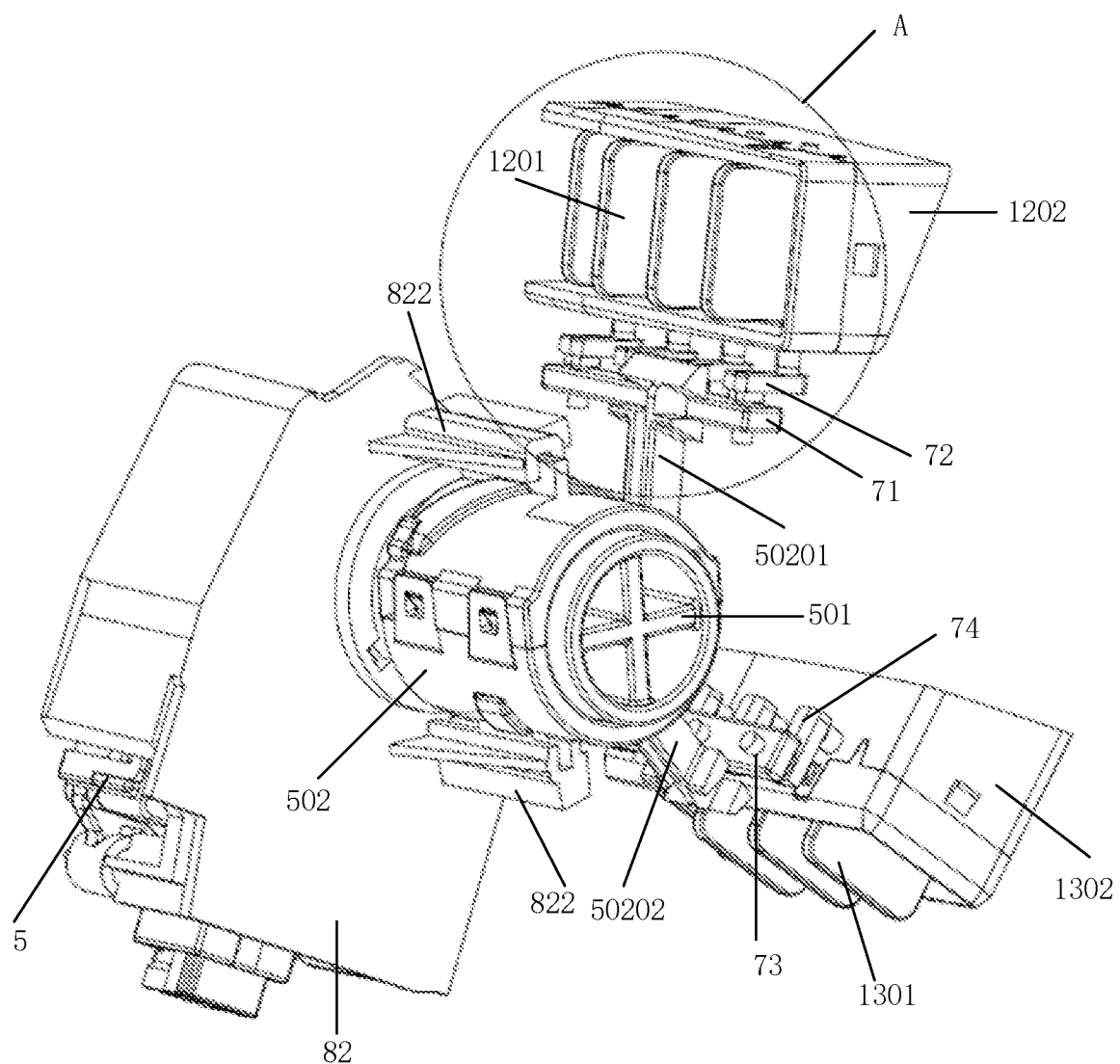
FIG. 5 is a schematic structural diagram of part of the structure of the air supply device of the invention, showing at least a first louver structure, a second louver structure, a connecting column, a column sleeve and a second driving member.
Figure 7:
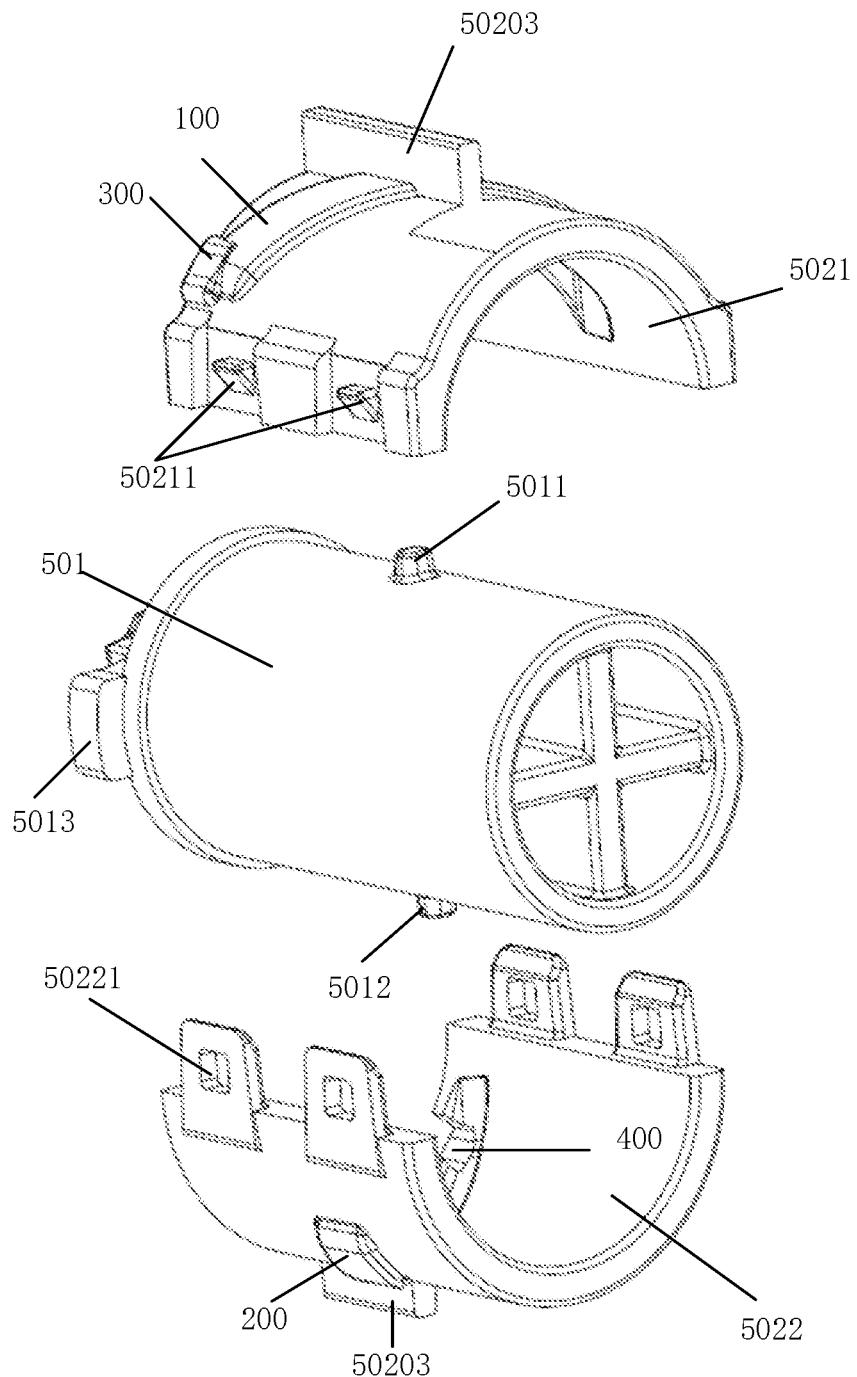
FIG. 7 is an exploded view of the connecting column and the column sleeve in the air supply device of the invention.

Preferably, as shown in FIGS. 5 and 7, the second driving member 5 is a second electric motor, a connecting column 501 is fixedly connected to an output portion of the second electric motor, a first protrusion 5011 and a second protrusion 5012 are formed on the connecting column 501, a column sleeve 502 is fitted over the connecting column 501, a first helical groove 100 and a second helical groove 200 respectively corresponding to the first protrusion 5011 and the second protrusion 5012 are formed on the column sleeve 502, and the first helical groove 100 and the second helical groove 200 have the same helical direction. A first transmission rod 50201 and a second transmission rod 50202 are further fixed to the column sleeve 502, the first transmission rod 50201 is connected to the first louver structure 1201 by means of a first transmission assembly, and the second transmission rod 50202 is connected to the second louver structure 1301 by means of a second transmission assembly. A third sliding structure 50203 is disposed on the column sleeve 502, and a fourth sliding structure 811 slidably connected to the third sliding structure 50203 is also disposed in the shell 1, and the third sliding structure 50203 and the fourth sliding structure 811 can respectively slide only in an axial direction of the cylinder sleeve 502. The second electric motor can drive the column sleeve 502 to rotate such that the first protrusion 5011 and the second protrusion 5012 respectively slide in the first helical groove 100 and the second helical groove 200, the column sleeve 502 moves in the axial direction, the first transmission rod 50201 and the second transmission rod 50202 then both move in the axial direction, and the first transmission assembly and the second transmission assembly are moved to drive the first louver structure 1201 and the second louver structure 1301 to swing together in the same direction.

Instead of the electric motor, the second driving member 5 may also be an air cylinder, which is directly connected to the column sleeve 502 to drive the column sleeve 502. Those skilled in the art would have been able to flexibly the specific structure of the second driving member 5 in practical applications, and such adjustments and changes in the specific structure of the second driving member 5 do not limit the invention, which shall be limited within the scope of protection of the invention. The connecting column 501 may be a solid cylinder. If course, in a more preferred case, the connecting column 501 comprises a cylindrical casing and a cross-shaped support rib (as shown in FIG. 7) disposed in the cylindrical casing. With such a configuration, materials are saved, and it is also possible to ensure that the connecting column 501 has a suitable strength. The third sliding structure 50203 may be a sliding groove, a slider, etc., and the fourth sliding structure 811 may accordingly be a slider, a sliding groove, etc. Those skilled in the art would have been able to flexibly the specific structures of the third sliding structure 50203 and the fourth sliding structure 811 in practical applications, and such adjustments and changes in the specific structures of the third sliding structure 50203, the fourth sliding structure 811 and the transmission member 6 do not limit the invention, which shall be limited within the scope of protection of the invention. It should be noted that the fourth sliding structure 811 disposed in the shell 1 may be connected to the shell 1 or may be connected to other components, for example, a mounting base 81 of the first electric motor, and a mounting base 82 of the second electric motor. Further preferably, as shown in FIG. 7, the column sleeve 502 comprises a first half column sleeve 5021 and a second half column sleeve 5022, the first helical groove 100 is formed on the first half column sleeve 5021, the second helical groove 200 is formed on the second half column sleeve 5022, the first half column sleeve 5021 is provided with a first snap-fit portion 50211, the second half column sleeve 5022 is provided with a second snap-fit portion 50221, and the first snap-fit portion 50211 is snap-fitted with the second snap-fit portion 50221. The first snap-fit portion 50211 and the second snap-fit portion 50221 may be a snap hook and a snap slot, a snap slot and a snap button, etc. Those skilled in the art would have been able to flexibly the specific structures of the first snap-fit portion 50211 and the second snap-fit portion 50221 in practical applications, as long as the first snap-fit portion 50211 and the second snap-fit portion 50221 can be snap-fitted each other.

Alternatively, the column sleeve 502 may be configured to comprise a first half column sleeve 5021 and a second half column sleeve 5022 which are slidably connected to each other, the first helical groove 100 is formed in the first half column sleeve 5021, the second helical groove 200 is formed in the second half column sleeve 5022, and the first helical groove 100 and the second helical groove 200 have opposite helical directions. In this way, the first louver structure 1201 and the second louver structure 1301 can swing together in opposite directions, that is to say, the first louver structure 1201 and the second louver structure 1301 swing together in opposite directions. With such a configuration, air can flow out of the first louver structure 1201 and the second louver structure 1301 in different transverse directions at the same time, so that the use requirements for multi-directional air outflow can be met.

Figure 6:
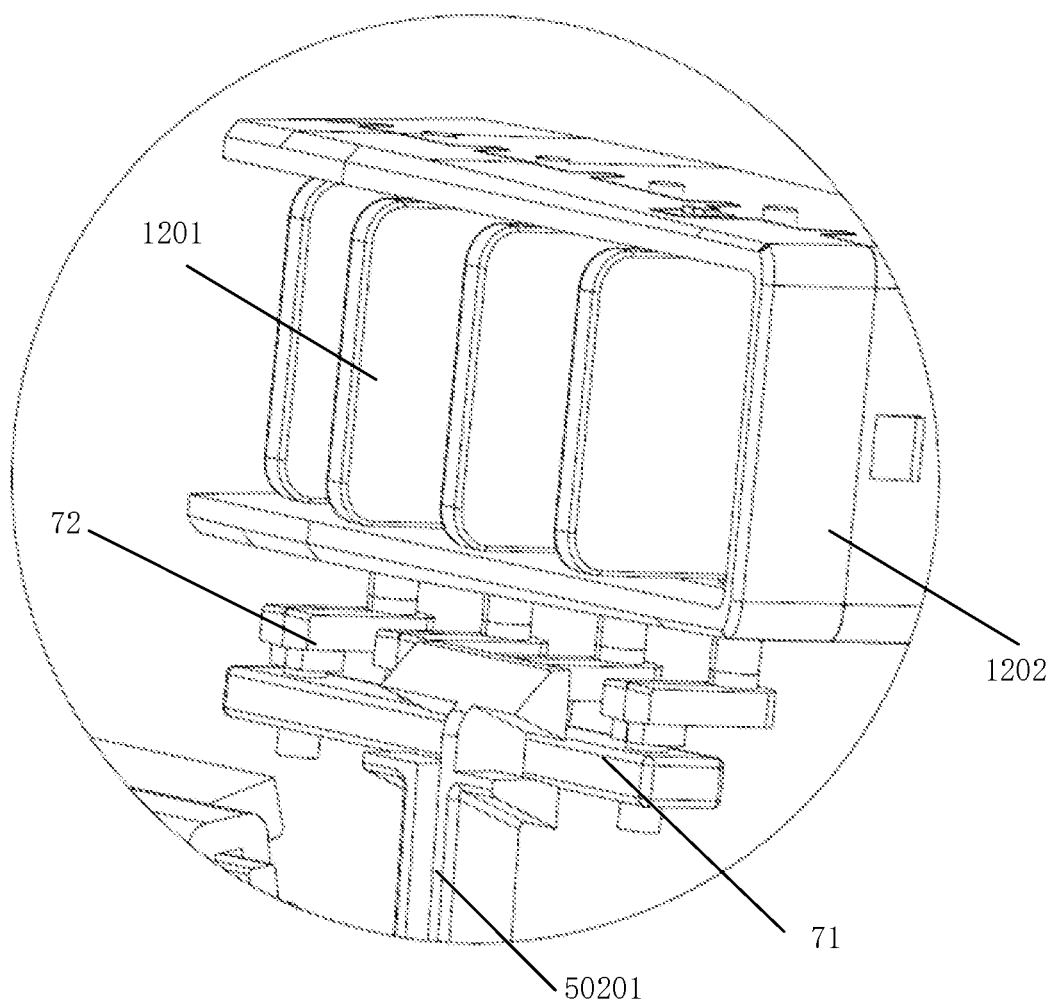
FIG. 6 is an enlarged view of portion A in FIG. 5.

Preferably, as shown in FIGS. 5 and 6, the first louver structure 1201 comprises a plurality of first louvers, and the first transmission assembly comprises a first mounting plate 71 and at least one first connecting rod 72. The first mounting plate 71 is fixedly connected to the first transmission rod 50201, the first connecting rods 72 are equal in number to the first louvers and correspond to the first louvers on a one-to-one basis, a first end of each first connecting rod 72 is hinged to the first mounting plate 71, and a second end of each first connecting rod 72 is fixedly connected to the corresponding first louver. A first mounting frame 1202 is disposed in the outlet of the first air outflow section 12, and each first louver is hinged to the first mounting frame 1202. The second louver structure 1301 comprises a plurality of second louvers, and the second transmission assembly comprises a second mounting plate 73 and at least one second connecting rod 74. The second mounting plate 73 is fixedly connected to the second transmission rod 50202, the second connecting rods 74 are equal in number to the second louvers and correspond to the second louvers on a one-to-one basis, a first end of each second connecting rod 74 is hinged to the second mounting plate 73, and a second end of each second connecting rod 74 is fixedly connected to the second louver corresponding thereto. A second mounting frame 1302 is disposed in the outlet of the second air outflow section 13, and each second louver is hinged to the second mounting frame 1302. When the first transmission rod 50201 and the second transmission rod 50202 move in the same direction, the first mounting plate 71 and the second mounting plate 73 both move in the same direction and finally make all the first louvers and all the second louvers swing together in the same direction.

Alternatively, the first transmission assembly may be configured to comprise a gear and a rack that mesh with each other. The rack is fixedly connected to the first transmission rod 50201, a connecting shaft is disposed on the first louvers, and the connecting shaft passes through a central hole of the gear and is fixedly connected to the gear. When the first transmission rod 50201 moves, the rack also moves therewith and drives the gear to rotate, thereby rotating the first louvers. Similarly, the second transmission assembly may use a gear and rack structure, which will not be described in detail. Those skilled in the art would have been able to flexibly the specific structures of the first transmission assembly and the second transmission assembly in practical applications, and such adjustments and changes in the specific structures of the first transmission assembly and the second transmission assembly do not limit the invention, which shall be limited within the scope of protection of the invention.

In a possible case, as shown in FIG. 7, a first auxiliary mounting groove 300 and a second auxiliary mounting groove 400 are formed in the end of the column sleeve 502 close to the output portion of the second electric motor, the first auxiliary mounting groove 300 is in communication with the end of the first helical groove 100 close to the output portion of the second electric motor, and the second auxiliary mounting groove 400 is in communication with the end of the second helical groove 200 close to the output portion of the second electric motor. With such a configuration, when the column sleeve 502 and the connecting column 501 are assembled, the first protrusion 5011 and the second protrusion 5012 can respectively enter the first helical groove 100 and the second helical groove 200 through the first auxiliary mounting groove 300 and the second auxiliary mounting groove 400, facilitating assembly of the column sleeve 502 and the connecting column 501.

In another possible case, a third auxiliary mounting groove and a fourth auxiliary mounting groove are formed in the end of the column sleeve 502 remote from the output portion of the second electric motor, the third auxiliary mounting groove is in communication with the end of the first helical groove 100 remote from the output portion of the second electric motor, and the fourth auxiliary mounting groove is in communication with the end of the second helical groove 200 remote from the output portion of the second electric motor. With such a configuration, when the column sleeve 502 and the connecting column 501 are assembled, the first protrusion 5011 and the second protrusion 5012 can respectively enter the first helical groove 100 and the second helical groove 200 through the third auxiliary mounting groove and the fourth auxiliary mounting groove, facilitating assembly of the column sleeve 502 and the connecting column 501.

In still another possible case, a first auxiliary mounting groove 300 and a second auxiliary mounting groove 400 are formed in the end of the column sleeve 502 close to the output portion of the second electric motor, the first auxiliary mounting groove 300 is in communication with the end of the first helical groove 100 close to the output portion of the second electric motor, and the second auxiliary mounting groove 400 is in communication with the end of the second helical groove 200 close to the output portion of the second electric motor; and a third auxiliary mounting groove and a fourth auxiliary mounting groove are formed in the end of the column sleeve 502 remote from the output portion of the second electric motor, the third auxiliary mounting groove is in communication with the end of the first helical groove 100 remote from the output portion of the second electric motor, and the fourth auxiliary mounting groove is in communication with the end of the second helical groove 200 remote from the output portion of the second electric motor. With such a configuration, when the column sleeve 502 and the connecting column 501 are assembled, the first protrusion 5011 and the second protrusion 5012 can respectively either enter the first helical groove 100 and the second helical groove 200 through the first auxiliary mounting groove 300 and the second auxiliary mounting groove 400, or enter the first helical groove 100 and the second helical groove 200 through the third auxiliary mounting groove and the fourth auxiliary mounting groove, providing two ways of assembly, and further facilitating assembly of the column sleeve 502 and the connecting column 501.

Preferably, as shown in FIG. 4, a rotation stop structure 5013 is disposed on the connecting column 501, a limiting structure is disposed on a mounting base 82 of the second electric motor, and the limiting structure can restrict a rotation stroke of the rotation stop structure 5013 to restrict a rotation stroke of the connecting column 501, thereby restricting swing ranges of the first louver structure 1201 and the second louver structure 1301. In the case shown in FIG. 4, the rotation stop structure 5013 is a rotation stop plate, and the limiting structure is two limiting blocks, and the rotation stop plate can only move between the two limiting blocks, namely, the rotation stroke of the rotation stop plate is restricted. Of course, the rotation stop structure 5013 may also be configured as a slider, and the limiting structure may be configured as a limiting groove in which the slider slides. When sliding to two ends of the limiting groove, the slider is limited, thereby restricting the rotation stroke of the slider. Those skilled in the art would have been able to flexibly the specific structures of the rotation stop structure 5013 and the limiting structure in practical applications, as long as the limiting structure can restrict the rotation stroke of the rotation stop structure 5013 to restrict the rotation stroke of the connecting column 501, thereby restricting the swing ranges of the first louver structure 1201 and the second louver structure 1301.

Preferably, a flow guiding structure is disposed between the outlet of the first air outflow section 12 and the outlet of the second air outflow section 13. The flow guiding structure comprises a first flow guiding portion and a second flow guiding portion. A first end of the first flow guiding portion is connected to the outlet of the first air outflow section 12, and the first flow guiding portion is configured to be capable of guiding a flow in a tangential direction of the outlet of the first air outflow section 12. A first end of the second flow guiding portion is connected to the outlet of the second air outflow section 13, and the second flow guiding portion is configured to be capable of guiding a flow in a tangential direction of the outlet of the second air outflow section 13. A second end of the first flow guiding portion is connected to a second end of the second flow guiding portion.

The "tangential direction" of the invention will be explained below by taking the first air outflow section 12 and the first flow guiding portion as an example, which specifically means that the first flow guiding portion is connected to an edge of the outlet of the first air outflow section 12, and an extension direction of the first flow guiding portion is substantially parallel to the air outflow direction of the first air outflow section 12, thereby ensuring that the air coming out of the first air outflow section 12 can be delivered by a longer distance under the action of the first flow guiding portion, and that the air straightly flows.

Further, the shape of the outlet of the first air outflow section 12 may be a rectangle as illustrated in FIG. 1, or may be a circle, etc. Accordingly, the shape of the first flow guiding portion also needs to be adjusted adaptively according to the shape of the outlet of the first air outflow section 12. Those skilled in the art would have been able to flexibly set the shape of the outlet of the first air outflow section 12 and the shape of the first flow guiding portion, as long as long-distance straight delivery of the air discharged from the first air outflow section 12 can be achieved under the action of the first flow guiding portion, and this adjustment of the shape does not limit the invention. Similarly, those skilled in the art would have been able to flexibly set the shape of the outlet of the second air outflow section 13 and the shape of the second flow guiding portion, which will not be described in detail herein.

In a preferred case, the shape of the outlet of the first air outflow section 12 is the same as that of the outlet of the second air outflow section 13 (for example, the outlet of the first air outflow section 12 and the outlet of the second air outflow section 13 shown in FIG. 1 are both rectangles with the same sizes), thereby providing a more favorable structural foundation for fluid design for the distribution of the air amount and the adjustment of the air outflow direction. Of course, in practical applications, the shape of the outlet of the first air outflow section 12 and the shape of the outlet of the second air outflow section 13 may also be different, which is not limited by the invention.

Preferably, the outlet of the first air outflow section 12 and the outlet of the second air outflow section 13 are each provided with a grid, which can at least play a decorative role.

Furthermore, the invention further provides a console. The console is disposed between a driver seat and a co-driver seat, and comprises a housing and the air outflow device as described above. The air outflow device is disposed in the housing, a covering portion is formed to extend on the housing, and the covering portion is capable of at least partially shielding the outlet of the first air outflow section 12 and the outlet of the second air outflow section 13.

Preferably, two air outflow devices are disposed in the housing, the outlets of the first air outflow sections 12 of the two air outflow devices are both located at the upper portion, the outlets of the second air outflow sections 13 of the two air outflow devices are both located at the lower portion, and the outlets of the first air outflow sections 12 of the two air outflow devices may share a grid or may separately use a grid. Similarly, the outlets of the second air outflow sections 13 of the two air outflow devices may share a grid or may separately use a grid. When the first louver structures 1201 and the second louver structures 1301 of the air outflow devices swing in the same direction, by disposing two air outflow devices, air can be delivered in different transverse air outflow directions at the same time. For example, one of the air outflow devices delivers air to the left and the other of the air outflow devices delivers air to the right.

Finally, the invention further provides a vehicle, comprising the air outflow device as described above or the console as described above. It should be noted that if the vehicle comprises an air outflow device, the air outflow device may be disposed between any two adjacent seats, or may be disposed at an instrument panel, etc.

Heretofore, the technical solutions of the invention have been described in conjunction with the preferred embodiments shown in the drawings, however, those skilled in the art can readily understand that the scope of protection of the invention is obviously not limited to these specific embodiments. Those skilled in the art could make equivalent changes or substitutions to the related technical features without departing from the principles of the invention, and all the technical solutions after the changes or the substitutions will fall within the scope of protection of the invention.

The invention claimed is:

1. An air outflow device, comprising a shell, wherein an air channel is formed in the shell, the air channel comprises an air inflow section and a first air outflow section and a second air outflow section separately in communication with the air inflow section, an opening/closing member and an air distribution member are rotatably disposed in the air inflow section, and an outlet of the first air outflow section and an outlet of the second air outflow section are respectively provided with a first louver structure and a second louver structure; when air flows out of both the outlet of the first air outflow section and the outlet of the second air outflow section, an airflow flowing out of the outlet of the first air outflow section is capable of at least partially merging with an airflow flowing out of the outlet of the second air outflow section; a first driving member and a second driving member are disposed outside the air channel; and the first driving member is capable of driving the opening/closing member to open/close the air inflow section so as to connect/disconnect the air inflow section, and is capable of driving the air distribution member to rotate so as to adjust an opening degree of an inlet of the first air outflow section or an inlet of the second air outflow section, adjusting an air outflow amount and a longitudinal air outflow direction, and the second driving member is capable of driving the first louver structure and the second louver structure to swing together so as to adjust a transverse air outflow direction, wherein the first driving member is a first electric motor, the air distribution member is fixedly connected to an output portion of the first electric motor, a first sliding structure and a stop member are further fixedly connected to the output portion of the first electric motor, a transmission member fixedly connected to the opening/closing member is disposed outside the air channel, and a second sliding structure is disposed on the transmission member; when the first sliding structure is not slidably connected to the second sliding structure, the stop member is capable of preventing the movement of the transmission member; and when the first sliding structure is slidably connected to the second sliding structure, the stop member is capable of disengaging from the transmission member to allow the movement of the transmission member under the action of the first sliding structure.

2. The air outflow device according to claim 1, wherein the stop member is a stop block having an arc-shaped groove, and an arc-shaped edge slidably cooperating with the arc-shaped groove is formed on the transmission member.

3. The air outflow device according to claim 1, wherein the second driving member is a second electric motor, a connecting column is fixedly connected to an output portion of the second electric motor, a first protrusion and a second protrusion are formed on the connecting column, a column sleeve is fitted over the connecting column, a first helical groove and a second helical groove respectively corresponding to the first protrusion and the second protrusion are formed on the column sleeve, the first helical groove and the second helical groove have the same helical direction, and a first transmission rod and a second transmission rod are further fixed to the column sleeve; the first transmission rod is connected to the first louver structure by means of a first transmission assembly, and the second transmission rod is connected to the second louver structure by means of a second transmission assembly; a third sliding structure is disposed on the column sleeve, a fourth sliding structure slidably connected to the third sliding structure is further disposed in the shell, and the third sliding structure and the fourth sliding structure are relatively slidable only in an axial direction of the column sleeve;

the second electric motor is capable of driving the column sleeve to rotate such that the first protrusion and the second protrusion respectively slide in the first helical groove and the second helical groove, the column sleeve moves in the axial direction, the first transmission rod and the second transmission rod then both move in the axial direction, and the first transmission assembly and the second transmission assembly are moved to drive the first louver structure and the second louver structure to swing together in the same direction.

4. The air outflow device according to claim 3, wherein the first louver structure comprises a plurality of first louvers, and the first transmission assembly comprises a first mounting plate and at least one first connecting rod, wherein the first mounting plate is fixedly connected to the first transmission rod, the first connecting rods are equal in number to the first louvers and correspond to the first louvers on a one-to-one basis, a first end of each of the first connecting rods is hinged to the first mounting plate, and a second end of each of the first connecting rods is fixedly connected to the corresponding first louver; a first mounting frame is disposed in the outlet of the first air outflow section, and each of the first louvers is hinged to the first mounting frame;

the second louver structure comprises a plurality of second louvers, the second transmission assembly comprises a second mounting plate and at least one second connecting rod, wherein the second mounting plate is fixedly connected to the second transmission rod, the second connecting rods are equal in number to the second louvers and correspond to the second louvers on a one-to-one basis, a first end of each of the second connecting rods is hinged to the second mounting plate, and a second end of each of the second connecting rods is fixedly connected to the corresponding second louver; a second mounting frame is disposed in the outlet of the second air outflow section, and each of the second louvers is hinged to the second mounting frame; and when the first transmission rod and the second transmission rod move in the same direction, the first mounting plate and the second mounting plate both move in the same direction and finally make all of the first louvers and all of the second louvers swing together in the same direction.

5. The air outflow device according to claim 3, wherein a first auxiliary mounting groove and a second auxiliary mounting groove are formed in the end of the column sleeve close to the output portion of the second electric motor, the first auxiliary mounting groove is in communication with the end of the first helical groove close to the output portion of the second electric motor, and the second auxiliary mounting groove is in communication with the end of the second helical groove close to the output portion of the second electric motor; and/or a third auxiliary mounting groove and a fourth auxiliary mounting groove are formed in the end of the column sleeve remote from the output portion of the second electric motor, the third auxiliary mounting groove is in communication with the end of the first helical groove remote from the output portion of the second electric motor, and the fourth auxiliary mounting groove is in communication with the end of the second helical groove remote from the output portion of the second electric motor.

6. The air outflow device according to claim 3, wherein a rotation stop structure is disposed on the connecting column, a limiting structure is disposed on a mounting base of the second electric motor, and the limiting structure is capable of restricting a rotation stroke of the rotation stop structure to restrict a rotation stroke of the connecting column, thereby restricting swing ranges of the first louver structure and the second louver structure.

7. A console, comprising a housing and the air outflow device according to claim 1, wherein the air outflow device is disposed in the housing, a covering portion is formed to extend on the housing, the covering portion is capable of at least partially shielding the outlet of the first air outflow section and the outlet of the second air outflow section.

8. A vehicle, comprising the air outflow device according to claim 1.

* * * * *